United States Patent
Dau et al.

(10) Patent No.: US 6,578,687 B2
(45) Date of Patent: Jun. 17, 2003

(54) PRESSURE PLATE ASSEMBLY FOR A FRICTION CLUTCH

(75) Inventors: Andreas Dau, Würzburg (DE); Andreas Orlamünder, Schweinfurt (DE); Albert Kammermeier, Sulzheim (DE); Hartmut Bach, Schweinfurt (DE); Cora Carlson, Hambach (DE); Matthias Dörfler, Schweinfurt (DE); Günther Esly, Wasserlosen (DE); Reinhard Feldhaus, Poppenhausen (DE); Ingrid Hoffelner, Knetzgau (DE); Christoph Kleuker, Gochsheim (DE); Paul Kraus, Niederwerrn (DE); Bernd Peinemann, Niederwerrn (DE); Michael Peterseim, Bergrheinfeld (DE); Gerhard Röll, Eisenheim (DE); Ralf Till, Euerbach (DE); Sebastian Vogt, Bad Neustadt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/950,201

(22) Filed: Sep. 10, 2001

(65) Prior Publication Data

US 2002/0066633 A1 Jun. 6, 2002

(30) Foreign Application Priority Data

Sep. 8, 2000 (DE) .......................... 100 44 504
Jun. 1, 2001 (DE) .......................... 101 26 773

(51) Int. Cl.⁷ ............................................. F16D 13/44
(52) U.S. Cl. .................................. 192/70.18; 192/200
(58) Field of Search .......................... 192/70.18, 70.28, 192/200, 84.94, 109 R; 267/158; 464/84, 100, 101, 169

(56) References Cited

U.S. PATENT DOCUMENTS

| | | | | |
|---|---|---|---|---|
| 2,029,516 A | * | 2/1936 | Tower | 464/82 |
| 4,353,444 A | * | 10/1982 | Bionaz | 192/200 |
| 4,607,738 A | * | 8/1986 | Muller | 192/109 R |
| 4,697,679 A | * | 10/1987 | Naudin | 192/109 R |
| 5,080,213 A | * | 1/1992 | Sunaga | 192/200 |
| 5,154,669 A | * | 10/1992 | Weiss et al. | 464/100 |
| 6,109,413 A | * | 8/2000 | Young | 192/70.18 |
| 6,332,516 B1 | * | 12/2001 | Arhab | 192/70.18 |

FOREIGN PATENT DOCUMENTS

| | | | |
|---|---|---|---|
| DE | 198 48 582 | | 4/2000 |
| FR | 2 553 484 A1 | * | 4/1985 |

* cited by examiner

*Primary Examiner*—Rodney H. Bonck
(74) *Attorney, Agent, or Firm*—Cohen, Pontani, Lieberman & Pavane

(57) ABSTRACT

A pressure plate assembly for a friction clutch includes a housing arrangement and a pressure plate arrangement, which is held by at least one leaf spring arrangement with freedom of axial movement relative to the housing arrangement. The at least one leaf spring arrangement is fixed by a first attachment area to a first fastening area of the pressure plate arrangement and by a second attachment area to a second fastening area of the housing arrangement. The end area of the first fastening area and/or the second fastening area curves away from the minimum of one leaf spring arrangement, this end area being located in the area along which the at least one leaf spring arrangement extends.

11 Claims, 4 Drawing Sheets

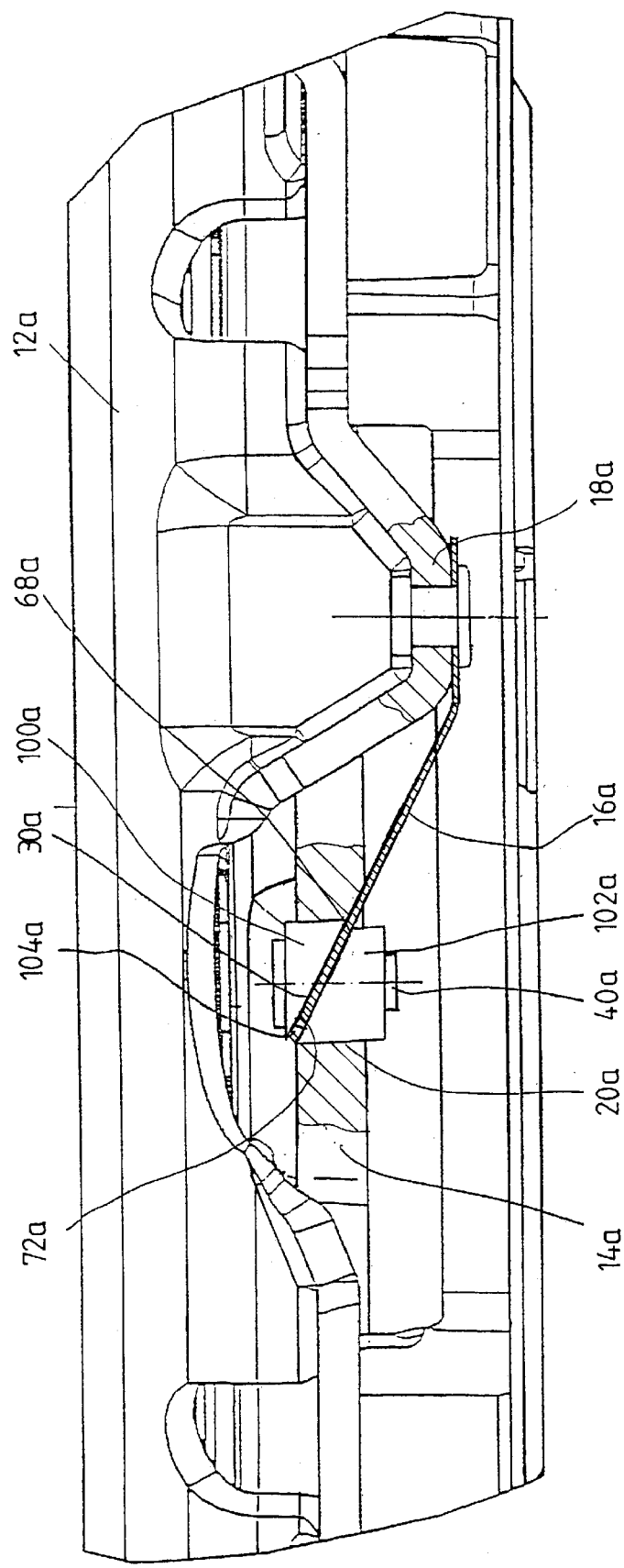

PRESSURE PLATE ASSEMBLY FOR A FRICTION CLUTCH

BACKGROUND OF THE INVENTION

1. Field of the Invention

The present invention pertains to a friction clutch, comprising a housing arrangement and a pressure plate arrangement, which is held by at least one leaf spring arrangement with freedom of axial movement with respect to the housing arrangement. The at least one leaf spring arrangement is fixed by a first attachment area to a first fastening area on the pressure plate assembly and by a second attachment area to a second fastening area on the housing arrangement.

2. Description of the Related Art

A pressure plate assembly of this type is known from, for example, DE 198 48 582. An axial view of a pressure plate assembly of this type is shown schematically in FIG. 1. This pressure plate assembly comprises a housing arrangement 12, which can be fixed to a flywheel to assemble a friction clutch. A pressure plate 14 is provided in the housing arrangement 12. A plurality of leaf spring arrangements 16, each of which can comprise, for example, a single leaf spring element, is provided between the housing arrangement 12 and the pressure plate 14 so that the two components can move in the axial direction with respect to each other but are essentially unable to rotate relative to each other. One end of each leaf spring arrangement 16 is fixed to a fastening section 18 on the housing arrangement 12 by means of, for example, a clinch bolt or the like, whereas the other end is fixed to a fastening section 20 on the pressure plate 16.

In pressure plate assemblies of this type, the leaf spring arrangements or leaf spring elements of the arrangements curve in the axial direction between the two attachment areas where they are connected to the housing arrangement 12 and to the pressure plate 14. This curvature is relatively pronounced especially in the case of friction clutches in which a self-reinforcing effect is provided when the force which presses the two components together is applied. The result is that line contact can be produced against the edges of the fastening sections facing in the circumferential direction, especially when the leaf spring arrangements are under load. This type of contact can lead to an increase in stress and to the rapid fatigue of the leaf spring arrangements in these areas.

SUMMARY OF THE INVENTION

The object of the present invention is to design a pressure plate assembly of the general type in question such that the leaf spring arrangement or arrangements of the assembly are protected from excessive loads in the areas where they are connected to the pressure plate arrangement and to the housing arrangement.

According to a first aspect of the invention, this object is achieved by a friction clutch, comprising a housing arrangement and a pressure plate arrangement, which is held by at least one leaf spring arrangement with freedom of movement in the axial direction relative to the housing arrangement. The at least one leaf spring arrangement is fixed by a first attachment area to a first fastening area on the pressure plate arrangement and by a second attachment area to a second fastening area on the housing arrangement.

It is also provided that the end of the first fastening area and/or of the second fastening area curves away from the minimum of one leaf spring arrangement at a certain point along the length of the at least one leaf spring arrangement.

By curving the fastening area away from its associated leaf spring arrangement, the exertion of pressure along a line is avoided, especially during transitions between unloaded and loaded states of the leaf spring arrangement, because the leaf spring arrangement can come to rest gradually against the curved surface area.

It is can be provided, for example, that the section of the length of the minimum of one leaf spring arrangement near its end is curved, and that the first fastening area and/or the second fastening area curves in the same direction.

In order to arrive at the stress-relief effect described above even while the leaf spring arrangement is still being held in a defined position, it is proposed that the end of the first fastening area and/or of the second fastening area, starting from a surface extending essentially parallel to the surface of the first attachment area and/or of the second attachment area, curves gradually away from the minimum of one leaf spring arrangement.

Especially when housing arrangements or pressure plate arrangements of very high manufacturing precision can be provided, i.e., when there is no need for any finish machining to obtain a specified thickness, for example, it can be provided that the end of the first fastening area and the end of the second fastening area are formed by integral sections of the pressure plate arrangement and of the housing arrangement, respectively. As an alternative, it is also possible for the ends of the first and second fastening areas to be formed on support elements fixed in place relative to the pressure plate arrangement and the housing arrangement, respectively.

According to another embodiment of the present invention, the object indicated above is achieved by a pressure plate assembly for a friction clutch, comprising a housing arrangement and a pressure plate arrangement, which is held by at least one leaf spring arrangement with freedom of movement in the axial direction relative to the housing arrangement. The at least one leaf spring arrangement is fixed by a first attachment area to a first fastening area on the pressure plate assembly and by a second attachment area to a second fastening area on the housing arrangement.

It also provided according to the invention that a length of the minimum of one leaf spring arrangement situated near the first fastening area curves away from the first fastening area and/or that a length of the minimum of one leaf spring arrangement situated near the second fastening area curves away from the second fastening area.

Curving the leaf spring arrangement away from its associated fastening area has the same result as before, namely, that, even during the transition to a loaded state, the pressure exerted by the leaf spring arrangement and the housing arrangement or the pressure plate arrangement on each other is not concentrated along a zone of linear contact.

So that the desired curved configuration of the leaf spring arrangement can be provided especially in applications with self-reinforcing pressure plate assemblies, it is proposed that a length of the minimum of one leaf spring arrangement following the length which curves away from the first fastening area or the second fastening area, curves in the opposite direction.

In accordance with another aspect of the present invention, the task described above is accomplished by a pressure plate assembly for a friction clutch, comprising a housing arrangement and a pressure plate arrangement, which is held by at least one leaf spring arrangement with freedom to move in the axial direction relative to the housing arrangement. The at least one leaf spring arrangement is fixed by a first attachment area to a first fastening area on the pressure plate assembly and by a second attachment area to a second fastening area on the housing arrangement.

It is also provided that, in the first attachment area and/or in the second attachment area, the minimum of one leaf spring arrangement is connected to the pressure plate arrangement or to the housing arrangement at an acute angle relative to a plane essentially perpendicular to the rotational axis of the pressure plate.

In this embodiment, therefore, at least one of the attachment areas of the leaf spring arrangement is installed at an angle from the very beginning, so that, on transitions between the unloaded and loaded states, the deformation which occurs and thus also any possible linear pressure which may also occur can be reduced.

In an embodiment of this type, it preferable for the minimum of one leaf spring arrangement to be essentially free of curvature at least in the unloaded state.

To obtain the angled mounting position, it is possible, for example, to provide at least one contact element with a contact surface extending at an acute angle to the plane in the first fastening area and/or in the second fastening area. This angled mounting position can also be obtained, for example, by designing the minimum of one contact element as an integral part of its associated fastening area. In this case, it is also preferable to provide a contact element with a contact surface extending at angle to the plane on both sides of the leaf spring arrangement in the first fastening area and/or in the second fastening area. In an embodiment of this type, which is especially advantageous with respect to fabrication and also assembly, it is also possible for the two contact elements to be in the form of slots, angled with respect to the plane, in the associated fastening area.

In the pressure plate assembly according to the invention, the minimum of one leaf spring arrangement can comprise one leaf spring element. It is preferable, furthermore, that the minimum of one leaf spring arrangement comprise one leaf spring element. As already explained above, an arrangement of this type is advantageous especially when it is desired to obtain a self-reinforcing clutch characteristic.

The present invention also pertains to a friction clutch in which a pressure plate assembly according to the invention is provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 6 shows a view of a pressure plate assembly according to the invention, looking in the radial direction from the outside.

DETAILED DESCRIPTION OF THE PRESENTLY PREFERRED EMBODIMENTS

Figure 1:
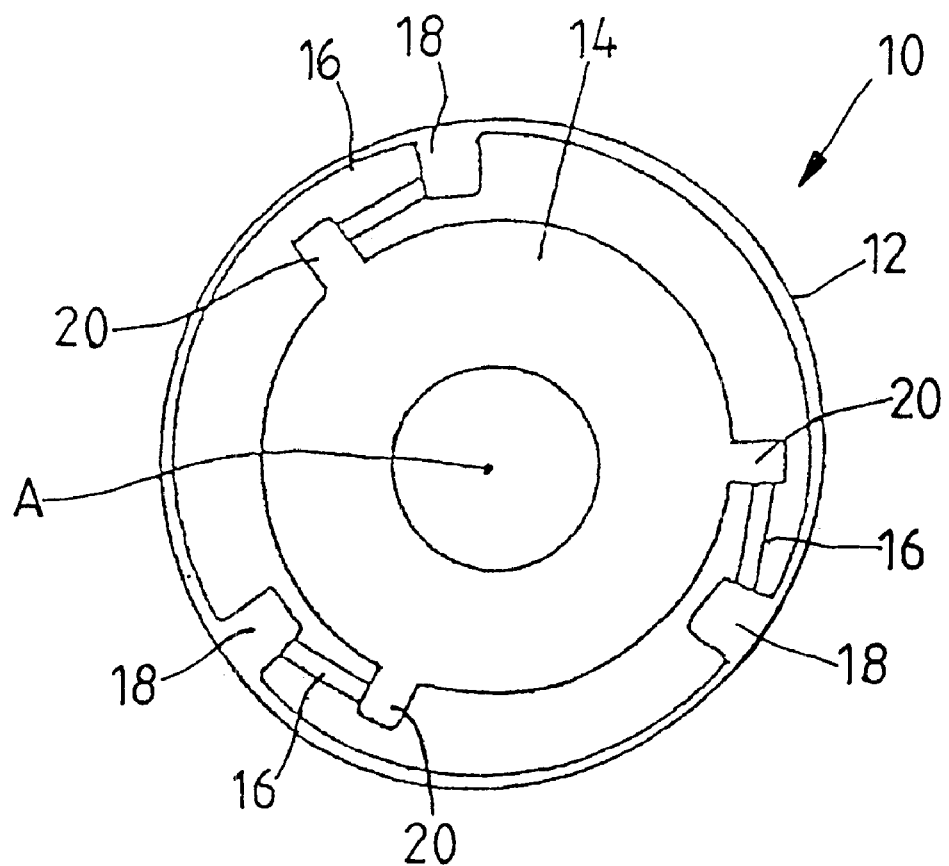
FIG. 1 shows a schematic axial view of a pressure plate assembly according to the invention.
Figure 2:
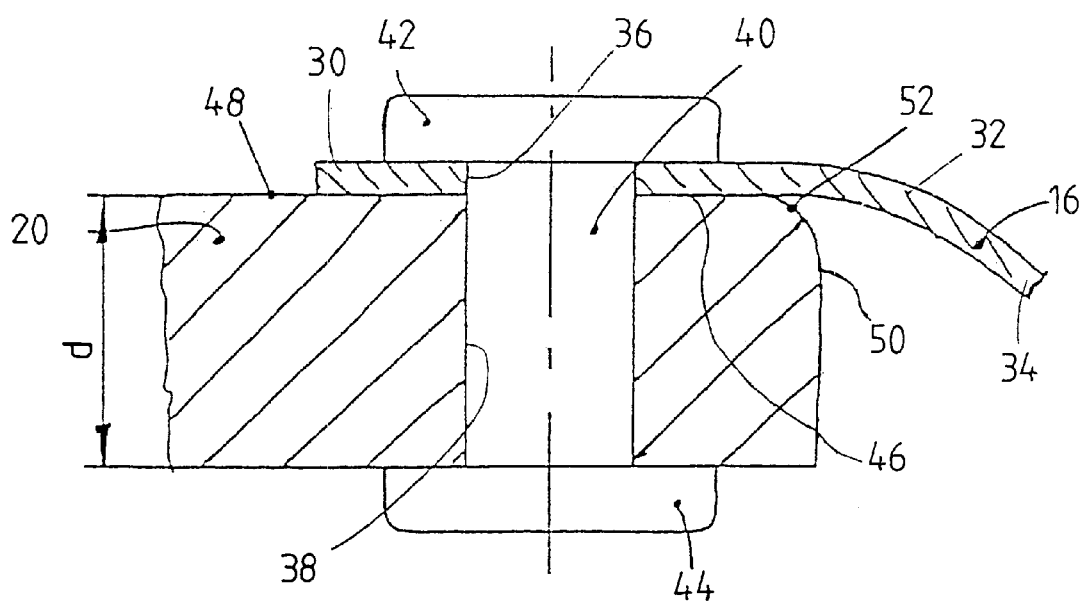
FIG. 2 shows the connection between a leaf spring arrangement and a pressure plate in a sectional view cut along a tangent.

FIG. 2 shows a fastening section 20 of the pressure plate 14 in cross section along a tangent, looking in the radial direction from the outside. A first attachment area 30 of a leaf spring element 16 is attached to this fastening section 20. The essentially straight first attachment area 30 continues as a curved section 32 and then becomes another essentially straight connecting section 34, which leads to a second attachment section (not shown in the figures), which, if desired, can then be attached to the housing arrangement 12, i.e., to a fastening section 18 of same, in the same way as shown in FIG. 2. In its attachment area 30, the leaf spring element 16 has a hole 36, and a corresponding hole 38 for a clinch bolt 40 is provided in the fastening section 20. For fixation, the clinch bolt 40 has rivet heads 42, 44 at its ends. In its attachment area 30, which is connected by the rivet heads 42, 44 to the pressure plate 14, that is, to the fastening section 20 of same, the leaf spring element 16 has a surface 46 which is essentially parallel to a surface 48 of the fastening section 20. This surface 48 is in turn essentially perpendicular to a rotational axis A of the pressure plate assembly 10, visible in FIG. 1. The fastening section 20 is designed with a curved surface 52 in the circumferential end area 50, which is located at a certain point along the length of the leaf spring element 16, that is, at a point close to or under the curved area 32 of the leaf spring element 16. This curved surface starts from the surface 48 parallel to the leaf spring element 16 and proceeds gradually in a continuous transition away from the leaf spring element 16. It can be seen in particular that the curved surface 52 curves in the same direction as the curved area 32 of the leaf spring element 16 between the first attachment area 30 and the connecting area 34.

By providing this type of curved surface 52 in the section where increased pressure is exerted against the pressure plate 14, i.e., against the fastening section 20 of same, upon transition of the leaf spring elements 16 between unloaded and loaded states, the pressure plate is prevented from digging like a sharp blade into the material of the leaf spring element 16. Instead, the leaf spring element 16, on transition between a more heavily loaded and a less heavily loaded state, can come to rest gradually against the pressure plate 14, i.e., against the fastening section 20 thereof, or move away from it in the same way.

The design variant shown in FIG. 2 is advantageous and easy to apply especially in cases where the pressure plate 14, which is usually designed with fastening sections 20 as integral parts, can be produced with such precision in the casting process that there is no need for any metal-removing finishing work afterwards to prepare the surface 48. The curved surface area 52 can thus be obtained simply by providing appropriately designed casting molds.

Figure 3:
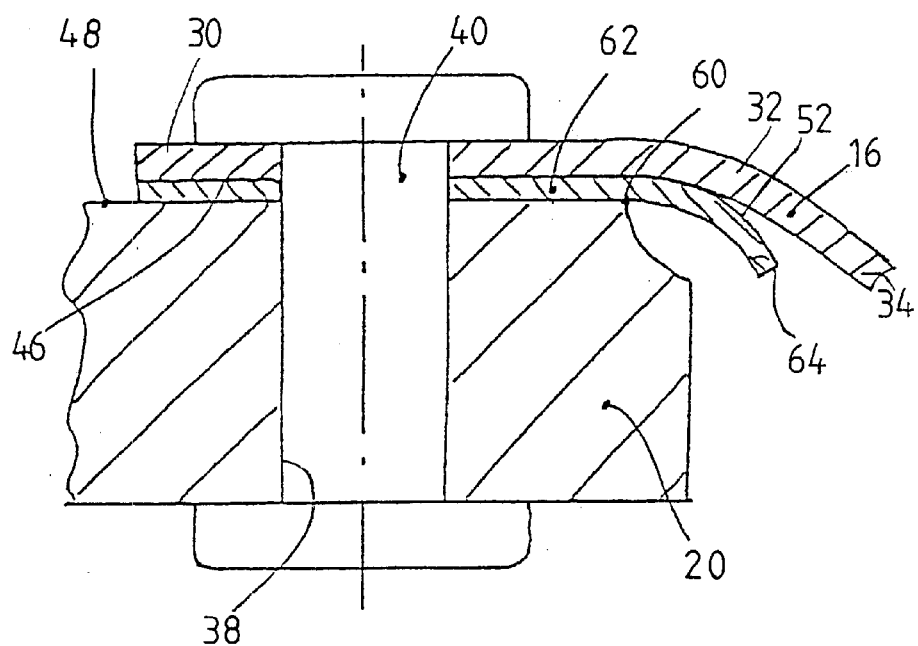
FIG. 3 shows an alternative design variant in a view similar to that of FIG. 2.

FIG. 3 shows an embodiment in which the thickness of the pressure plate has been corrected by a subsequent metal-removing process. This produces an edge-like or linear transition 60 from the surface 48, which is essentially parallel to the surface 46 of the first attachment area 30, to a circumferential edge section of the fastening section 20. A contact element 62 is provided between the first attachment area 30 and the fastening area 20 so that excessive load on the leaf spring element 16 is avoided in the area of the edge 60. This extends essentially parallel to the first attachment area 30 and is also designed with a curve at its end 64, which is situated at a certain point along the length of the leaf spring element 16 between its two attachment areas; that is, this end part curves in such a way that it proceeds gradually away from the leaf spring element 16. The curved surface 52, therefore, is provided on a separate component, namely, on the contact element 62, but a component which still belongs to the pressure plate assembly. Here, too, it can be seen that the surface 52 curves in the same direction as the leaf spring element 16 in the transition region 32 between the first attachment area 30 and the connecting area 34.

Figure 4:
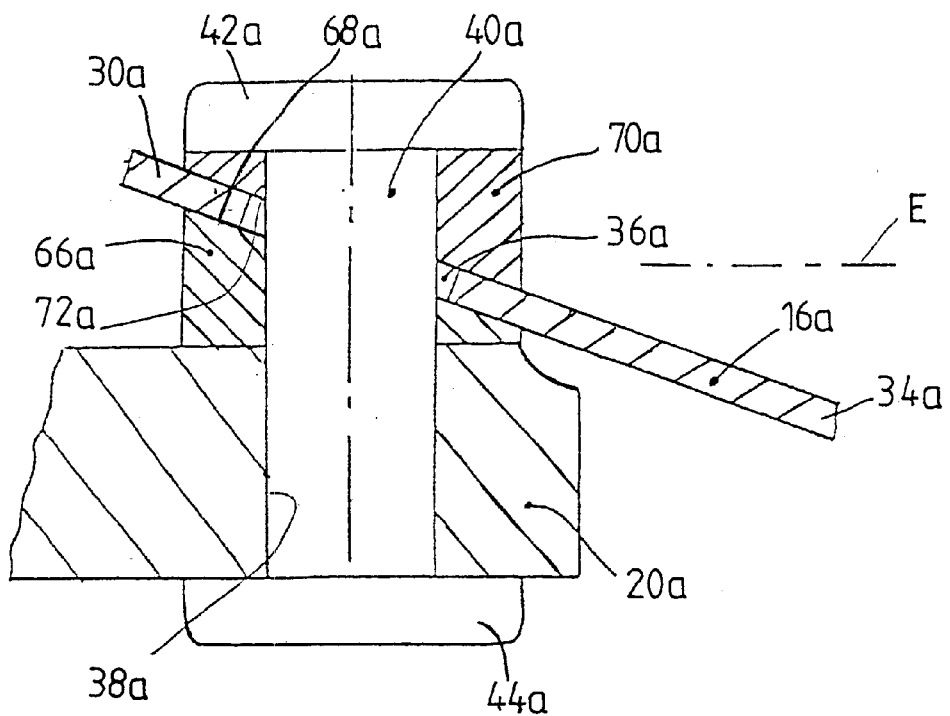
FIG. 4 shows another view of an alternative design variant in a view similar to that of FIG. 2.

Another embodiment is shown in FIG. 4. Components which are the same as those described above with respect to design or function are designated by the same reference number with an appended "a".

In the embodiment according to FIG. 4, the leaf spring element 16a is designed in such a way that it has essentially no curvature in the transition between the attachment area 30a and the attachment area 34a. The hole 36a, in contrast to the preceding design variant, has a larger diameter or a larger dimension in the lengthwise direction of the leaf spring element 16a. Between the first attachment area 30a and the fastening section 20a, there is a first wedge-like contact element 66a, the wedge surface 68a of which extends essentially in the circumferential direction, that is, in the direction in which the main length of the leaf spring element 16a extends. Above the leaf spring element 16a, on the side facing away from the fastening section 20a, there is a second wedge-like contact element 70a, the wedge surface 72a of which extends in the opposite direction. The first attachment area 30a is now situated between the two contact surfaces 68a, 72a, which are therefore essentially parallel to each other, which means that, in this first attachment area 30a, the leaf spring element 16a is connected to the pressure plate in such a way that it extends at an acute angle to the plane E, which is essentially perpendicular to the rotational axis A. As a result of this mounting at a slant, the deformation which occurs during operation is already anticipated, so that the linear-contact pressures which occur are also significantly reduced. Another advantage of this design is that essentially straight leaf spring elements 16a can be installed, which offer less resistance to the deformations which occur during operation and which are thus also subject to less fatigue.

To ensure in this design variant that the two wedge-shaped contact elements 66a, 70a are assembled with the correct orientation, they can have alignment devices, which cooperate with corresponding alignment devices on, for example, the leaf spring element 16a. For example, projections on one side can engage with associated recesses on the other side, so that a defined positional relationship is produced between the elements 66a, 70a and the leaf spring element 16a and, of course, also with respect to the pressure plate or its fastening section 20a.

FIG. 6 shows an alternative design, which makes use of the preceding principles, described in conjunction with FIG. 4, of the slanted orientation of an individual leaf spring element 16a in at least one attachment area, this being the first attachment area 30a in the example presented here.

It can also be seen here that two contact elements 100a, 102a are provided, the contact surfaces 68a, 72a of which face each other. These surfaces, as already described above, are at an angle to the plane E shown in FIG. 4. In the exemplary embodiment shown in FIG. 6, however, the contact elements 100a, 102a are not designed as separate components but rather as integral parts of the fastening section 20a of the pressure plate 14a, which section projects radially outward essentially like an arm. For this purpose, a slot 104a, which is at an angle to the plane E and extends radially inward from the outside, is provided in the fastening section 20a, so that the two facing surfaces forming the boundaries of the slot form the contact surfaces 68a, 72a. The width of the slot is designed to accommodate the thickness of an individual leaf spring element 16a. A clinch bolt 40a is again provided, which passes through holes in the two contact elements 100a, 102a, these holes being essentially parallel to the rotational axis. The bolt thus firmly joins the leaf spring element 16a by its first attachment area 30 to the pressure plate 14a.

Here, too, the arrangement is preferably designed so that the leaf spring element 16a, starting from its first attachment area 30a, has essentially no curvature in the load-free state, that is, in the disengaged state in which the stored-energy element is not acting on it.

In normal pull-type operation, the leaf spring element 16a is under tension, so that, as a result of the offset positioning of the two attachment areas shown, there is the tendency for the pressure plate 14a to be pressed more strongly against the friction linings of the clutch disk. So that it is possible to prevent leaf spring elements 16a of this type from being overloaded in the opposite direction, a housing stop against which the pressure plate 14a will come to rest after it rotates only a short distance in the opposite direction can be provided. As shown in FIG. 6, the pressure plate will be prevented from rotating any further upon a shift of the pressure plate 14a toward the right. It would also be possible to provide another interaction with the housing arrangement 12a in the other circumferential direction, that is, starting from the fastening area 20a and proceeding toward the left in FIG. 6, by means of an elastic element, which then, in push mode, absorbs the load in the form of tensile stress.

Figure 5:
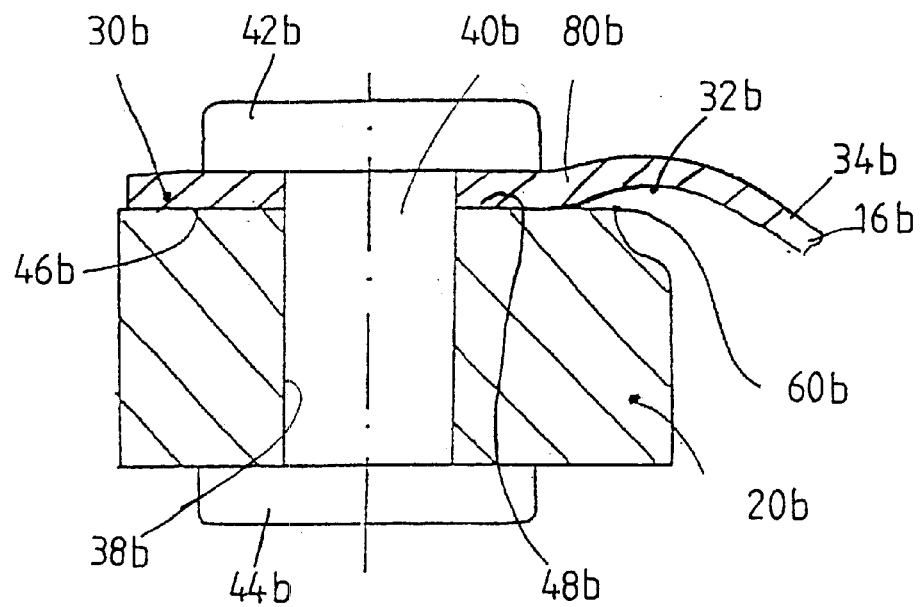
FIG. 5 shows another alternative design variant in a view similar to that of FIG. 2.

Another embodiment is shown in FIG. 5. Components which are similar to those described above with respect to design or function are designated by the same reference numbers with an appended "b".

In the design variant shown in FIG. 5, the leaf spring element 16b is curved either in the area adjacent to its first attachment area 30b, which is rigidly connected by the fastening bolt 40b to the fastening section 20b, or right in this attachment area 30b in such a way that it starts to extend away from the surface 48b of the fastening section 20b before it reaches the circumferential end area or final edge 60b. This area 80b, which curves away from the fastening section 20b, therefore lies in an area between the fastening bolt 40b and the circumferential end or terminal circumferential edge 60b of the fastening section 20b, beyond which the leaf spring element 16b extends. After this first curved area 80b, the leaf spring element 16b then has a curved area 32b, which curves in the opposite direction to make the transition to the connecting section 34b and thus to obtain the previously described angled configuration of a leaf spring element 16b of the type in question. When here, under load, the leaf spring element 16b is pressed toward the fastening section 20b and thus toward the edge 60b, its curved section 80b gradually comes to rest against the surface 48b. The curvature in area 80b is preferably such that, even under the greatest possible load, line-contact pressure or essentially line-contact pressure will not occur in the area of the edge 60b.

Embodiments of a pressure plate assembly have been described above in which, as a result of the special design of the leaf spring elements, a connection between the pressure plate and the housing can be obtained which is subject to a very low degree of fatigue. The essential aspect of all the embodiments is that excessive edge pressure in the area of interaction between the leaf spring elements and the sections where these elements are attached to the pressure plate or the housing will not occur. It is obvious but should nevertheless be pointed out in this context that, although in all of the configurations described above the leaf spring elements can also be attached to the housing of the pressure plate assembly in the same way, any other type of attachment can be selected in the area of the housing or, in the opposite case, in the area of the pressure plate. The obvious point should also be made that, in place of the individual leaf spring elements at the various individual fastening points, leaf spring element packages can be provided, in which case the leaf spring element adjacent to the associated fastening section in particular can be relieved of stress by the measures according to the invention. It should also be pointed out that especially when clinch blots are used as fastening means, it can advantageous to the stress-relief of the leaf spring elements in the opposite direction to design these bolts with a head profile in which essentially straight-line contact is produced between the leaf spring element and the head of the clinch bolt. This can be done by giving the head of the bolt a rectangular shape, for example, and by positioning one of the boundary areas or edges essentially crosswise to the longitudinal extent of the leaf spring element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly for a friction clutch, said assembly comprising
    a pressure plate arrangement having a first fastening area with a first end;
    a housing arrangement having a second fastening area with a second end;
    at least one leaf spring arrangement which holds said pressure plate arrangement with freedom of axial movement relative to said housing arrangement, said at least one leaf spring arrangement comprising a first attachment area fixed to said first fastening area, and a second attachment area fixed to said second fastening area, said at least one leaf spring arrangement passing over said first and second ends, at least one of said first and second ends curving away from said leaf spring arrangement, said at least one leaf spring arrangement being curved where it passes over said at least one of said ends, said at least one of said first and second ends being curved in the same direction as said leaf spring arrangement.

2. A pressure plate assembly as in claim 1 wherein at least one of said first and second fastening areas comprises a surface area which is parallel to at least one of said first and second attachment areas, the end of said at least one of said first and second fastening areas, starting from at least one of said surface areas, curving away from the at least one leaf spring arrangement.

3. A pressure plate assembly as in claim 1 wherein the end of the first fastening area is formed integrally with the pressure plate arrangement, and wherein the end of the second fastening area is formed integrally with the housing arrangement.

4. A pressure plate assembly as in claim 1 comprising a support element fixed relative to said pressure plate arrangement and forming said end of said first fastening area, and further comprising a support element fixed relative to said housing arrangement and forming said end of said second fastening area.

5. A pressure plate assembly as in claim 1 wherein each said at least one leaf spring arrangement consists of a single leaf spring.

6. A pressure plate assembly as in claim 1 wherein each said at least one leaf spring arrangement further comprises a connecting area extending between said first attachment area and said second attachment area, at least one of said first and second attachment areas extending at an acute angle to the plane of said connecting area.

7. A pressure plate assembly for a friction clutch, said assembly comprising
    a pressure plate arrangement having a first fastening area;
    a housing arrangement having a second fastening area;
    at least one leaf spring arrangement which holds said pressure plate arrangement with freedom of axial movement relative to said housing arrangement, said at least one leaf spring arrangement comprising a first attachment area fixed to said first fastening area, and a second attachment area fixed to said second fastening area, at least one said leaf spring arrangement having a length which curves away from at least one of said first and second fastening areas.

8. A pressure plate assembly as in claim 7 wherein said at least one said leaf spring arrangement further comprises, following said length which curves away from said at least one of said first and second fastening areas, a length which curves toward said at least one of said first and second fastening areas.

9. A pressure plate assembly for a friction clutch, said assembly comprising
    a pressure plate arrangement having a first fastening area surrounding a rotational axis;
    a housing arrangement having a second fastening area surrounding said rotational axis;
    at least one leaf spring arrangement which holds said pressure plate arrangement with freedom of axial movement relative to said housing arrangement, said at least one leaf spring arrangement comprising a first attachment area fixed to said first fastening area, and a second attachment area fixed to said second fastening area, at least one of said first and second attachment areas extending at an acute angle to a plane perpendicular to said rotational axis;
    at least one contact element fixed to at least one of said first and second fastening areas, said at least one contact element having a contact surface extending at said acute angle to said plane perpendicular to said rotational axis, said leaf spring arrangement being fixed to said contact surface; and a further contact element having a contact surface extending at an angle to said plane perpendicular to said rotational axis, said leaf spring arrangement being sandwiched between said contact surface of said further contact element and said contact surface of said contact element fixed to said at least one of said first and second fastening areas, said contact surfaces being formed by a slot in said fastening area.

10. A pressure plate assembly as in claim 9 wherein said at least one leaf spring arrangement is free from curvature when not under load.

11. A pressure plate assembly as in claim 9 wherein said at least one contact element is formed integrally with said at least one of said first and second fastening areas.

* * * * *